(12) United States Patent
Lee

(10) Patent No.: US 8,259,575 B2
(45) Date of Patent: Sep. 4, 2012

(54) INTERNET NETWORK APPARATUS AND METHOD OF TRANSFERRING DATA USING THE SAME

(75) Inventor: Young-ki Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 522 days.

(21) Appl. No.: 12/221,662

(22) Filed: Aug. 5, 2008

(65) Prior Publication Data

US 2009/0106446 A1    Apr. 23, 2009

(30) Foreign Application Priority Data

Oct. 17, 2007  (KR) .................. 10-2007-0104735
Mar. 13, 2008  (KR) .................. 10-2008-0023431

(51) Int. Cl.
*G01R 31/08* (2006.01)
(52) U.S. Cl. ......... 370/232; 370/468; 709/226; 709/233
(58) Field of Classification Search ........... 709/223–226
See application file for complete search history.

(56) References Cited

U.S. PATENT DOCUMENTS

| | | | |
|---|---|---|---|
| 7,292,602 B1 * | 11/2007 | Liu et al. ................ | 370/468 |
| 2002/0067768 A1 * | 6/2002 | Hurst ................ | 375/240.03 |
| 2005/0083920 A1 | 4/2005 | Barri et al. | |
| 2006/0095942 A1 * | 5/2006 | van Beek ................ | 725/81 |

FOREIGN PATENT DOCUMENTS

EP    0 708 564 A2    4/1996

OTHER PUBLICATIONS

Office Action established for CN 200810213356.8 (Jul. 26, 2011).

\* cited by examiner

*Primary Examiner* — Ian N Moore
*Assistant Examiner* — Jackie Zuniga
(74) *Attorney, Agent, or Firm* — Drinker Biddle & Reath LLP

(57) ABSTRACT

An Internet network apparatus and a method of transferring data are provided. An encoder encodes source data and then generates communication unit input data. A communication unit sequentially transmits the communication unit input data to a client via, in order, an application layer, a transport layer, an IP layer, and a network connection layer. A transmission rate determination unit compares the communication unit input data with communication unit output data or a client input data, wherein the communication unit output data is transferred via at least the transport layer and is output from the communication unit, and the client input data is transferred to at least one client. A transmission rate controlling unit controls the encoder in response to a comparison result of the transmission rate determination unit. The transmission rate can be correctly determined so as to effectively transmit data to a plurality of clients.

15 Claims, 7 Drawing Sheets

INTERNET NETWORK APPARATUS AND METHOD OF TRANSFERRING DATA USING THE SAME

CROSS-REFERENCE TO RELATED PATENT APPLICATION

This application claims the benefit of Korean Patent Application Nos. 10-2007-0104735 and 10-2008-0023431, filed on Oct. 17, 2007 and Mar. 13, 2008, respectively, in the Korean Intellectual Property Office, the disclosures of which are incorporated herein in its entirety by reference.

BACKGROUND

1. Field of the Invention

The present invention relates to an Internet network apparatus that can transmit data to a client, and particularly, to a plurality of clients, via a network, and a method of transferring data using the apparatus.

2. Description of the Related Art

In an Internet network system including a server storing various program files and a large amount of data and a client connected to a network, data must be correctly and promptly transferred between the server and the client. In order to correctly transfer data between the server and the client, it is important to check the size of data that should be transferred in real time. In particular, when one piece of data is transmitted to a plurality of clients, since the size of data that is transmitted to the respective clients can vary according to the circumstances of a network, it is required to measure the size of data that is transferred to each respective client in order to correctly transmit data to the all clients.

SUMMARY

The present invention provides an Internet network apparatus which can correctly determine a transmission rate for transmitting smoothly data to a client via a network, and a method of transferring data using the Internet network apparatus. The present invention also provides an Internet network apparatus for transmitting data to a plurality of clients, wherein the Internet network apparatus can determine a transmission rate for smoothly transferring data, and a method of transferring data using the Internet network apparatus.

According to an aspect of the present invention, there is provided an Internet network apparatus comprising: an encoder encoding source data and generating communication unit input data; a communication unit sequentially transmitting the communication unit input data to a client via an application layer, a transport layer, an Internet protocol (IP) layer and a network connection layer; a transmission rate determination unit comparing the communication unit input data with communication unit output data or a client input data, wherein the communication unit output data is transferred via at least the transport layer and is output from the communication unit, and the client input data is transferred to at least one client; and a transmission rate controlling unit controlling the encoder in response to a comparison result of the transmission rate determination unit.

The transmission rate determination unit may comprise: a first measurement unit measuring a size of the communication unit input data; a second measurement unit measuring a size of the communication unit output data or a size of the client input data; and a determination unit comparing the size of the communication unit input data, which is measured by the first measurement unit, and the size of the communication unit output data or the size of the client input data, which is measured by the second measurement unit. The source data may be image data. The transmission rate controlling unit may control the encoder to adjust any one selected from the group consisting of a frame rate, a bitrate, or a resolution of the image data in response to the comparison result of the transmission rate determination unit. When the transmission rate determination unit determines whether the size of first data measured by the first measurement is smaller than the size of second data measured by the second measurement unit, the transmission rate controlling unit may reduce the frame rate, the bitrate, or the resolution of the image data.

The transmission rate determination unit may comprise: a first measurement unit measuring the size of the communication unit input data; a second measurement unit measuring the size of the client input data input to at least one client; a calculation unit calculating the average size of the client input data; and a determination unit comparing the communication unit input data measured by the first measurement unit with the average size of the client input data calculated by the calculation unit. The calculation unit may add a correction value to the average value to generate an approximate average size, and the determination unit may compare the size of the communication unit input data with the approximate average size. The source data may be image data. The transmission rate controlling unit may control the encoder so as to adjust any one selected from the group consisting of a frame rate, a bitrate, or resolution of the image data in response to the comparison result of the transmission rate determination unit. When the transmission rate determination unit may determine whether first data measured by the first measurement is smaller than second data measured by the second measurement unit, the transmission rate controlling unit reduces the frame rate, the bitrate, and the resolution of the image data.

The communication unit may comprise: a ring buffer temporally storing the communication unit input data; an input controlling unit controlling the storing of the communication unit input data; and an output controlling unit controlling outputting of the stored data.

The input controlling unit may control storing data in the ring buffer according to an input pointer, a capacity of the ring buffer, and the size of data that is previously stored.

The output controlling unit may control reading data from the ring buffer according to an output pointer, information regarding an order of frames of a last image, and the order.

The client may have an output pointer (Pout). Thus, when a plurality of clients are connected to the Internet network apparatus, the respective clients can separately receive data that is output from a ring buffer. Since an input pointer assigning a location of a ring buffer at which the communication unit input data is to be copied and the output pointer are separately controlled, the ring buffer can be employed with one input and a plurality of outputs.

According to another aspect of the present invention, there is provided a method of transferring data by using an Internet network apparatus, wherein the method is performed by inputting source data, encoding the source data, inputting the encoded data to a communication unit, and sequentially transmitting the data to at least one client via an application layer, a transport layer, an IP layer and a network connection layer of the communication unit, the method further comprising: measuring a size of communication unit output data output from the communication unit or a size of client input data transmitted to the client, wherein the communication unit output data and the client input data are transferred via at least the transport layer; comparing the size of the communication unit input data with the size of the communication unit output data or the size of the client input data; and controlling the encoding of the source data according to a comparison result. The source data may be image data. The method may further comprise: when the size of the communication unit output data or the size of the client input data is greater than the size of the communication unit input data, encoding the source data so as to reduce a frame rate, a bitrate, or a resolution of the communication unit input data.

The method may further comprise: calculating the average size of the client input data that is input to a plurality of client; and comparing the communication unit input data with the average size of the client input data. The source data may be image data. The method may further comprise: when the average size of the client input data is greater than the size of the communication unit input data, encoding the source data so as to reduce a frame rate, a bitrate, or a resolution of the communication unit input data.

The method may further comprise: calculating an approximate average size of the client input data by adding a correction value to the average size; and comparing the communication unit input data with the approximate average size of the client input data. The source data may be image data. The method may further comprise: when the approximate average size of the client input data is greater than the communication unit input data, encoding the source data so as to reduce a frame rate, a bit rate, or a resolution of the communication unit input data.

The method may further comprise: copying the communication unit input data and storing communication unit input data in a ring buffer according to an input pointer, a capacity of the ring buffer, and the size of data that is previously stored; and reading data stored in the ring buffer according to an output pointer, information regarding an order of frames of a last image, and the order.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Hereinafter, the present invention will be described in detail by explaining exemplary embodiments of the invention with reference to the attached drawings.

Figure 1:
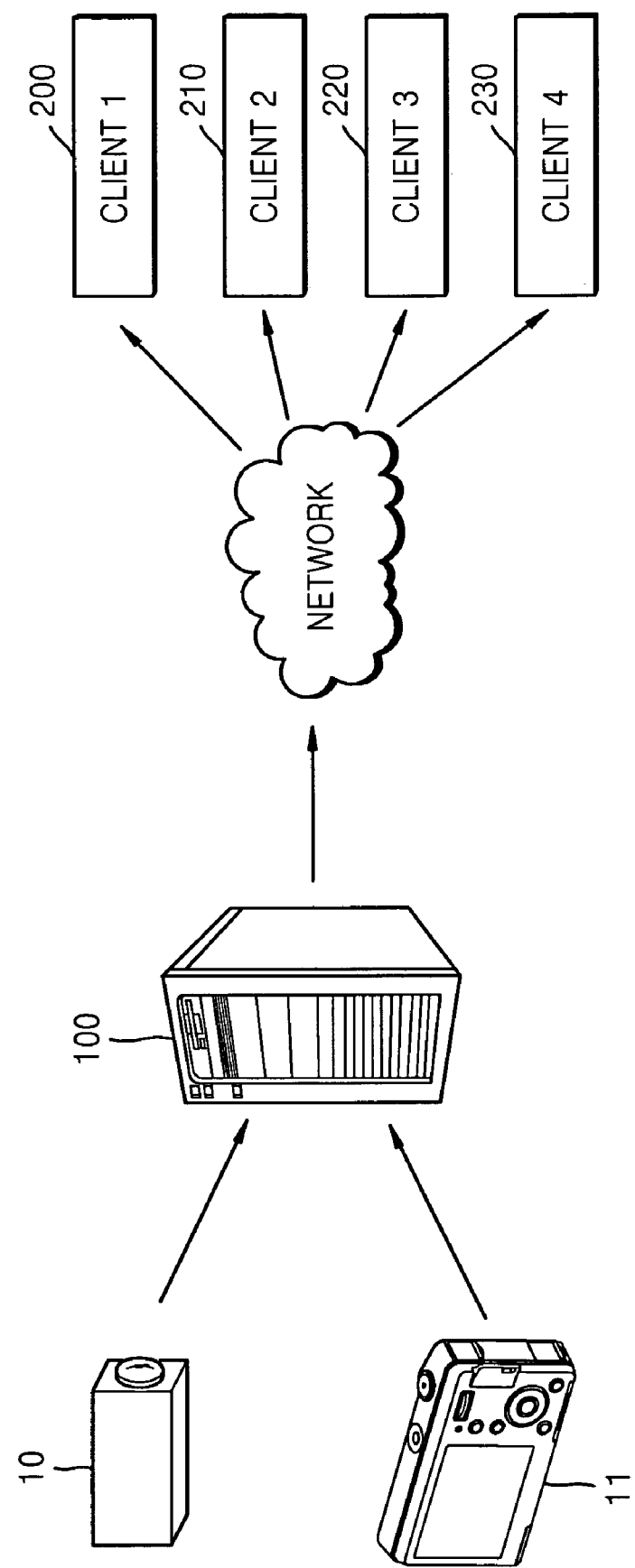
FIG. 1 is a schematic diagram illustrating an Internet network system, according to an embodiment of the present invention.

FIG. 1 schematically illustrates an Internet network system, according to an embodiment of the present invention. In the current embodiment, image data generated in a server 100 is transmitted to a plurality of clients by using an n-to-1 communication between different kinds of systems via a network. The server 100 illustrated in FIG. 1 is an Internet network apparatus according to embodiment of the present invention, but the present invention is not limited thereto. For example, when a digital video recorder (DVR) or an Internet protocol (IP) camera can individually process Internet communication, the Internet network apparatus may be a digital image processing apparatus, such as a DVR, or an IP camera may be the Internet network apparatus.

In particular, referring to FIG. 1, in the Internet network system, image data input from a DVR 10 or a digital camera 11 is stored in the server 100, and the server 100 provides the stored image data to a plurality of clients 200, 210, 220, and 230.

In the current embodiment, only image data is illustrated as being transferred, but the present invention is not limited thereto. That is, text data, audio data, or the like may be transferred too.

The server 100 measures the size of encoded data together with the size of data output from a communication unit or the size of data input to the clients 200, 210, 220 and 230, and then compares the sizes. In response to the comparison result, the server 100 controls encoding of data input to the server 100 so as to smoothly transmit data.

Moreover, in the current embodiment, when the clients 1 (200), 2 (210), 3 (220), and 4 (230) are connected to the server 100, since the clients 1 (200), 2 (210), 3 (220), and 4 (230) receive respective data by using their respective data output pointers (Pout) which are included in the clients 1 (200), 2 (210), 3 (220), and 4 (230), the server 100 can measure the size of the data transferred for each respective client. Based on the size of the data, the sever 100 can control the encoding of data input to the server 100.

Hereinafter, the server 100 that is an example of the Internet network apparatus will now be described in more detail with reference to FIG. 2. When source data is input to the server 100, an encoder 110 of the server 100 encodes the source data. Then, the encoded data is transmitted to a communication unit 120. The encoded data is referred to as communication unit input data. When the source data is image data, particularly, moving picture data, MPEG-4 encoding may be used for encoding the source data.

The encoded data is transferred between the server 100 and first and second clients 200 and 210 in accordance with a communication protocol comprising a layer structure. Thus, the communication unit 120 transmits and receives data to and from the first and second clients 200 and 210 in accordance with the communication protocol that includes an application layer 121, a transport layer 122, an IP layer 123, and a network connection layer 124.

In more detail, the application layer 121, the transport layer 122, the IP layer 123 and the network connection layer 124 share information with an application layer 201 or 211, a transport layer 202 or 212, an IP layer 203 or 213 and a network connection layer 204 or 214 of each of the first and second clients 200 and 201, respectively. For example, the application layer 121 shares information with the application layer 201 or 211 of each of the first and second clients 200 and 210. The application layer 121 transfers data that is input according to a user's application.

The transport layer 122 maintains a reliable transmission state with respect to the data transmitted by the application layer 121, and converts a message to be transmitted to the client into segments. In addition, in case of an error, the transport layer 122 indicates that the error is corrected and then the message is transferred to the client.

The IP layer 123 shares a packet between processors charged with communication via a network. That is, the IP layer 123 sets, maintains, and terminates a connection between the server 100 and the first and second clients 200 and 210, and selects and manages address settings, path settings, and network functions. Thus, the IP layer 123 checks whether the connection between nodes is cut. When the connection between the nodes is cut, the IP layer 123 restores the connection.

The network connection layer 124 transfers a control signal for synchronizing data transmission, a control signal for connection, communication and disconnection, a signal for coordinating data with a communication medium, or the like.

Throughout the specification, communication unit output data or client input data refers to data transferred via at least the transport layer 122. Thus, according to the present invention, the size of data including control data (i.e., transmission control protocol (TCP) header), which is encapsulated via at least the transport layer 122 of the server 100, is measured.

In particular, a transmission rate determination unit 130 measures not only the size of the data (i.e., the communication unit input data) that is input to the communication unit 120, but also the size of the data transferred via the communication unit 120, particularly, via the transport layer 122. That is, the transmission rate determination unit 130 measures the size of the communication unit output data or the size of the client input data. Conventionally, data is transmitted from an application layer to a transport layer, and then the size of the transmitted data is measured. That is, the application layer determines the size of the transmitted data, and controls the size of data to be input based on the measured size. Thus, the measured size of the transmitted data may differ from the size of data to be actually input to a client, and accordingly, it is difficult to determine the correct transmission rate. However, as described here, the size of data transmitted via at least the transport layer 122 is measured, and the size of the communication unit input data is determined. Thus, the transmission rate can be correctly measured. The transport layer 122 searches for and corrects data loss, and performs order recombination. By virtue of the control data encapsulated in the transport layer 122, that is, TCP header, the transmission rate, which is output from the communication unit 120 or is input to the first and second clients 200 and 210, can be correctly determined.

Thus, the transmission rate determination unit 130 monitors the TCP header that is the control data encapsulated via at least the transport layer 122 of the server 100, and then measures the size of the data output from the communication unit 120 or the size of the respective data input to the first and second clients 200 and 210. The size of first client input data that is input to the first client 200 and the size of second client input data that is input to the second client 210 can be separately measured.

In more detail, the transmission rate can be correctly determined by a Syn/Ack structure. The communication unit 120 performs synchronization of the size (Syn) of data that is currently transmitted and the size (Ack) of data that is previously transmitted. Thus, the communication unit 120 can determine the transmission rate by monitoring the two sizes. At this time, when a plurality of clients are connected to the server 100, the transmission rate can be calculated by adding Ack values received for each respective client and then dividing the Ack values by the number of the clients so as to obtain the mean Ack value. In addition, the size of the client input data can be adjusted by adding a correction value to the mean Ack value.

The transmission rate determination unit 130 compares the sizes of the communication unit input data with the communication unit output data. Alternatively, the transmission rate determination unit 130 compares the size of the communication unit input data with the size of the client input data or the mean size of data input to a plurality of clients.

A control signal in accordance with the comparison result of the transmission rate determination unit 130 is transmitted to a transmission rate controlling unit 140. Then, the transmission rate controlling unit 140 controls the encoder 110 to change a method of encoding data and setting conditions with respect to the source data, thereby controlling the transmission rate.

Regarding the comparison result of the transmission rate determination unit 130, if it is determined that the size of the communication unit input data is smaller than the size of the communication unit output data or the size of the client input data, it is determined that the Internet network apparatus is overloaded for transferring data, and thus the size of the communication unit input data has to be reduced. For example, with regard to image data, the size of the communication unit input data can be controlled by adjusting the resolution, frame rate, bitrate, etc., of the image data.

Figure 2:
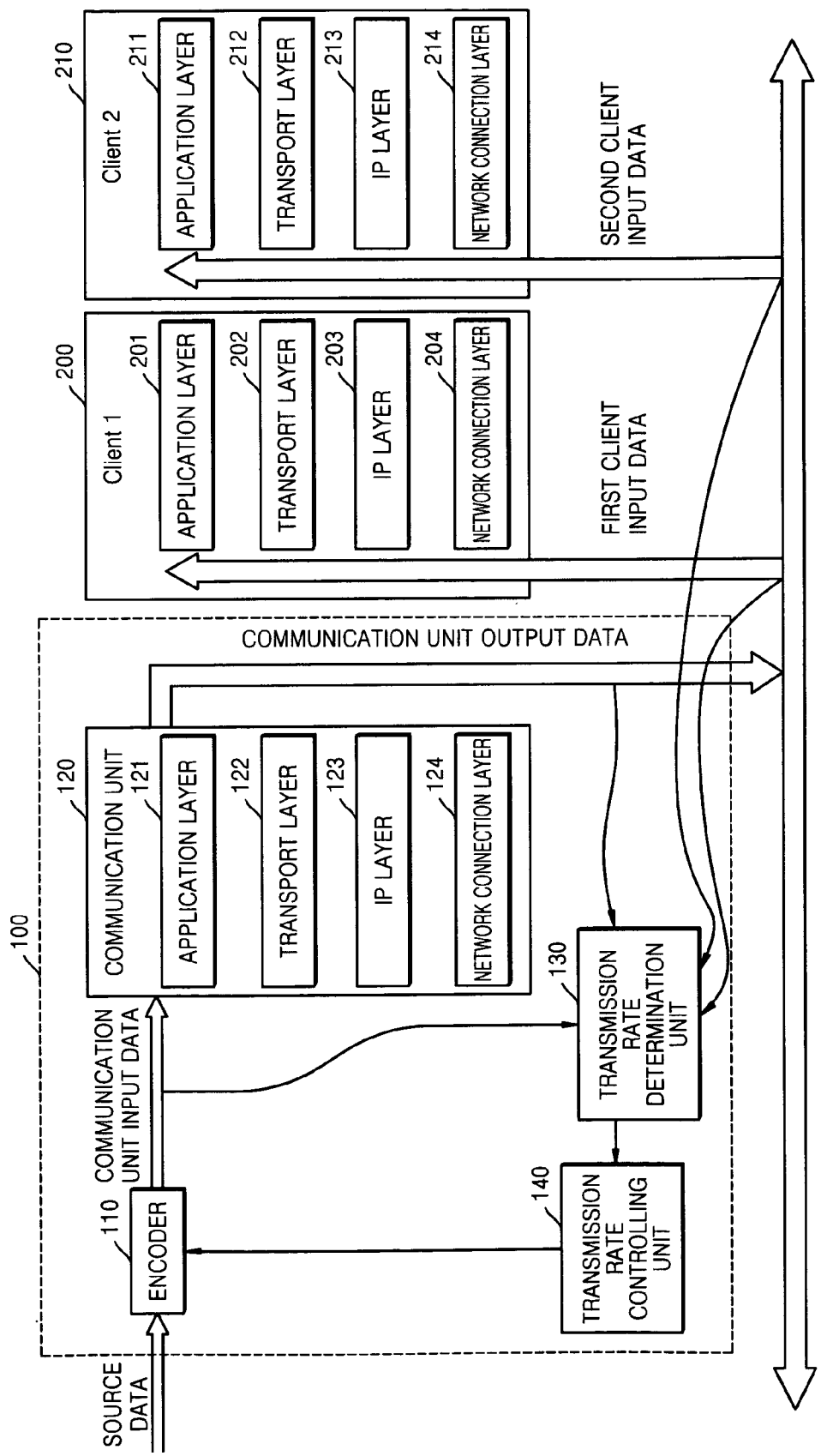
FIG. 2 is a block diagram illustrating an Internet network apparatus according to an embodiment of the present invention.
Figure 3:
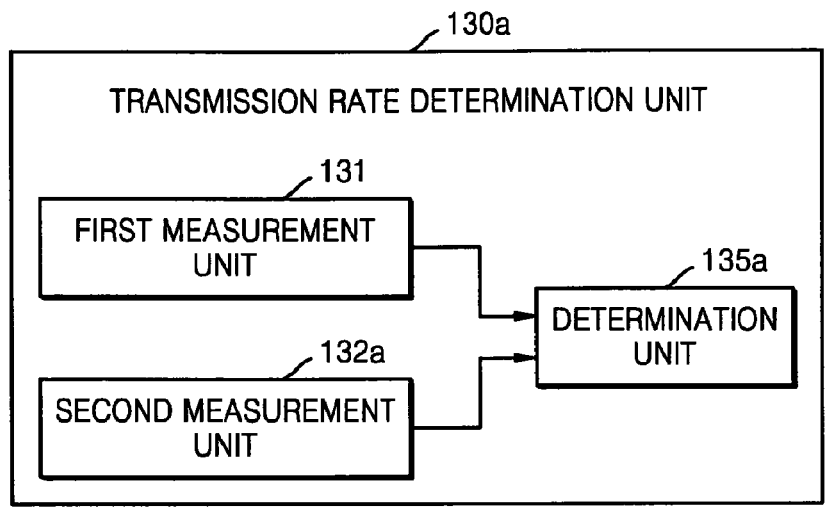
FIG. 3 is a block diagram of a transmission rate determination unit included in the Internet network apparatus of FIG. 2, according to an embodiment of the present invention.

FIG. 3 is a block diagram of a transmission rate determination unit 130a that is an example of the transmission rate determination 130 of the server 100 included in the Internet network apparatus of FIG. 2, according to an embodiment of the present invention.

The transmission rate determination unit 130a may include a first measurement unit 131 measuring the size of communication unit input data, a second measurement 132a measuring the size of communication unit output data or client input data, and a determination unit 135a comparing the size measured by the first measurement unit 131 with the size measured by the second measurement 132a.

The first measurement unit 131 periodically measures a packet size of the communication unit input data that is input from the encoder 110 (see FIG. 2) for each respective channel so as to obtain the statistics of the packet size.

The second measurement 132a monitors a TCP header of a packet of client input data in a network transmission line connected to a client, and then analyses a source IP address, a destination IP address, a port number for distinguishing a program performing communication operation from other programs, a sequence number for showing the byte order of data at the head of a packet that is currently transferred among entire data to be transferred, and an acknowledgement (ack) number for showing the byte order of data that reaches a receiving side. By analyzing and calculating these factors, the transmission rate can be periodically measured.

In addition, the second measurement 132a can measure the packet size of the communication unit output data of the communication unit 120 (see FIG. 1) by using control data that is encapsulated via at least the transport layer 122 (see FIG. 2).

The sizes measured by the first measurement unit 131 and the second measurement 132a are transmitted to the determination unit 135a, and then the determination unit 135a compares the values of the data.

In particular, when the size of the communication unit output data or the size of the client input data differs from the size of the communication unit input data, the determination unit 135a generates a control signal in accordance with this case, and transmits the control signal to the transmission rate controlling unit 140 (see FIG. 2). In addition, the transmission rate controlling unit 140 controls the encoder 110 (see FIG. 2) to generate the communication unit input data having the same size as the communication unit output data or the client input data.

Figure 4:
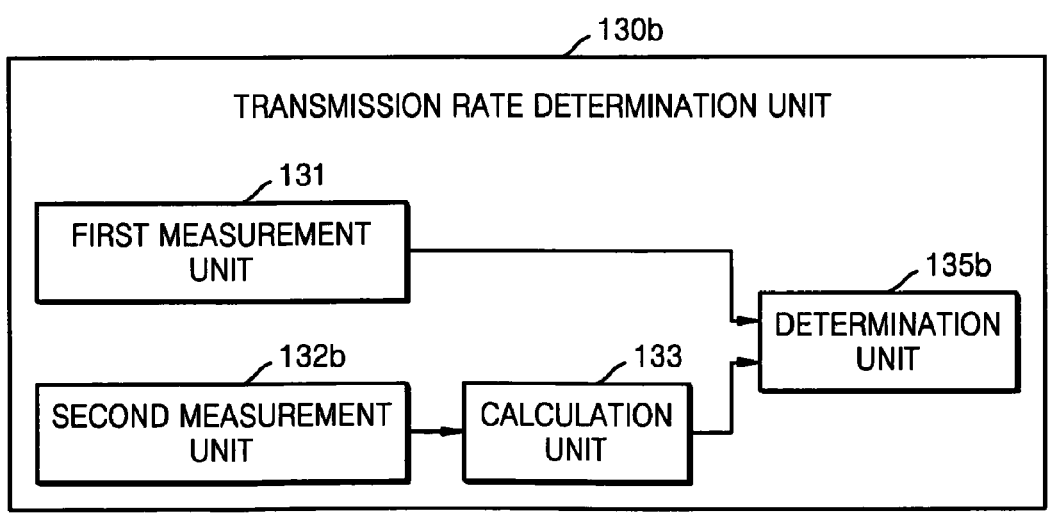
FIG. 4 is a block diagram of a transmission rate determination unit included in the Internet network apparatus of FIG. 2, according to another embodiment of the present invention.

As another example of the transmission rate determination unit 130 illustrated in FIG. 2, a transmission rate determination unit 130b will now be described with reference to FIG. 4. In the current embodiment, the transmission rate determination unit 130b determining the transmission rate with regard to a plurality of clients is exemplified. The same reference numerals in FIGS. 3 and 4 denote the same element, and thus the transmission rate determination unit 130b will be described in terms of the differences from the transmission rate determination unit 130a.

The transmission rate determination unit 130b may include a first measurement unit 131 measuring the size of communication unit input data, a second measurement unit 132b separately measuring the sizes of data input to a plurality of clients, a calculation unit 133 calculating the average size or the approximate average size of the data input to the clients, wherein the sizes of the data are provided from the second measurement unit 132b, and a determination unit 136b comparing the size of the communication unit input data with the average size or the approximate average size.

In the case of a plurality of clients, the second measurement unit 132b can separately measure the sizes of the data input to the clients.

In addition, the calculation unit 133 adds the sizes of the data input to the clients, wherein the sizes of the data are provided by the second measurement unit 132b, so as to calculate the average size of the data. For example, when 100 bytes of data are generated, 80 bytes of data are transmitted to a first client, and 40 bytes of data are transmitted to a second client, the average transmission rate is 60 bytes. By using the mean transmission rate, the transmission rate can be determined and controlled. However, in reality, by using the approximate average transmission rate that is the sum of the average transmission rate and a predetermined correction value, the transmission rate can be determined and controlled.

For example, when the average size of 60 bytes of data is transmitted to clients, the transmitting rate is 60%. Thus, the approximate average size of 66% is obtained by adding a correction value of 6 to the average size. The correction value of 6 is added since the communication unit 120 (see FIG. 2) is very sensitive to the change of a network when the size of the communication unit input data is reduced directly to 60% in accordance with the transmission rate of 60 bytes.

In more detail, the correction value of 6 is selected because the transmission rate is expressed in multiples of tens since it is complicated to adjust the transmission rate in multiples of one hundred. Thus, a correction value that is initially calculated is divided by ten. For example, if a correction value is 57%, a final correction value is 57/10=5. In reality, since 57% is closer to 60% than 50%, (57+6)/10=6 is employed in order to obtain the round-off value to 60. Thus, the correction value of 6 is selected.

The determination unit 136b compares the average size or the approximate average size which is provided by the calculation unit 133 and the size of the communication unit input data provided by the first measurement unit 131. When the average size is different from the size of the communication unit input value, or when the approximate average size is different from the size of the communication unit input value, a control signal corresponding to this case is transmitted to the transmission rate controlling unit 140 (see FIG. 2).

Figure 5:
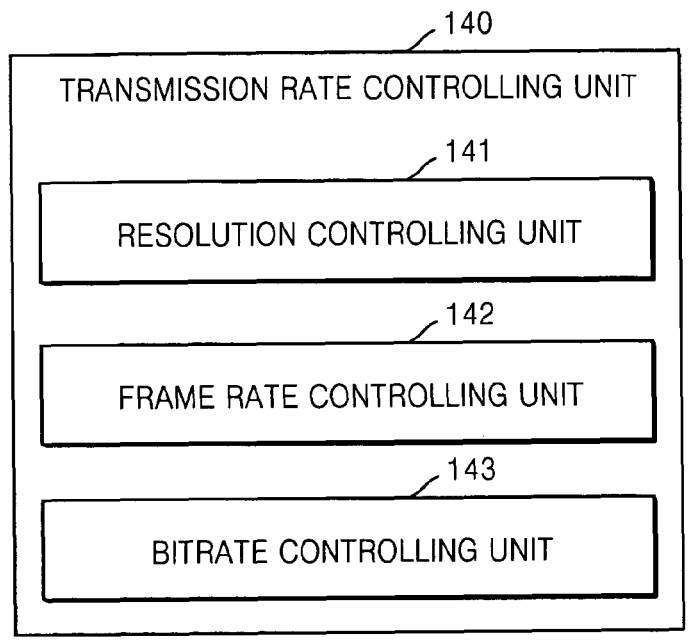
FIG. 5 is a block diagram of a transmission rate controlling unit of a server, that is, the Internet network apparatus of FIG. 2, according to an embodiment of the present invention.

The transmission rate controlling unit 140 (see FIG. 2) will now be described in more detail with reference to FIG. 5. In the current embodiment, with regard to image data, the transmission rate controlling unit 140 controlling the size of image data is exemplified.

The transmission rate controlling unit 140 may include at least one of a resolution controlling unit 141, a frame rate controlling unit 142, and a bitrate controlling unit 143.

With regard to image data, since the size of image data varies according to its resolution, the transmission rate controlling unit 140 may include the resolution controlling unit 141 for adjusting the resolution in order to change the size of the image data. Thus, the determination unit 135a or 135b (see FIG. 3 or 4) can adjust the resolution so as to match the size of the communication unit input data with the size of the communication unit output data or the size of the client input data when the size of the communication unit input data is different from the size of the communication unit output data or the size of the client input data.

In the case of a plurality of clients, the average size of data input to the clients and the approximate average size that is the sum of the average size and a correction value can be compared with the size of the communication unit input data. For example, when the size of the communication unit output data or the size of the client input data is smaller than the size of the communication unit input data, since it is determined that the communication unit is overloaded, the size of the communication unit input data needs to be reduced. In the case of a plurality of clients, when the average size or the approximate average size is smaller than the size of the communication unit input data, the size of the communication unit input data is controlled to be reduced. That is, the encoder needs to be controlled to generate the communication unit input data having the same size as the communication unit output data, the client input data, the average size or the approximate average size. Thus, when encoding source data, the encoder 110 (see FIG. 2) is controlled to reduce current resolution.

When moving picture data including a plurality of frames is transmitted, the frame rate controlling unit 142 can adjust the size of the moving picture data by adjusting a frame rate corresponding to the number of frames that are transmitted per second. The frame rate needs to be reduced in order to reduce the size of the moving picture data, and the frame rate needs to be increased in order to increase the size of the moving picture.

The bitrate controlling unit 143 can also control the size of data. For example, the bitrate is reduced in order to reduce the size of data, and the bitrate is increased in order to increase the size of data, thereby adjusting the size of the data. Such bitrate controlling is performed according to a general method and will be described in more detail with reference to FIG. 10.

When one piece of data is transmitted to a plurality of clients 1 (200) and 2 (210), the clients 1 (200) and 2 (210) can separately receive the data by using ring buffering, which will be described with reference to FIG. 6. Thus, the sizes of data transmitted to the clients 1 (200) and 2 (210) can be measured, and are compared with the average size of input data, thereby controlling the transmission rate.

The average size of data transmitted to the clients 1 (200) and 2 (210) (i.e., the average size of the client input data) is calculated. At this time, when the average size is determined to differ from the size of the communication unit input data, the size of the communication unit input data can be controlled to be equal to the average size of the client input data. That is, encoding of input data can be controlled to match the size of the communication unit input data with the average size of the client input data or the smallest size of the client input data.

In addition, when source data is separately encoded for each respective client, or when source data is separately encoded for each respective predetermined group of clients, the size of the communication unit input data can be controlled so as to match the size of the communication unit input data with the average size of data input to the clients or with the average size of data input to the group of clients. That is, encoding of the source data can be controlled for each respective client.

Figure 6:
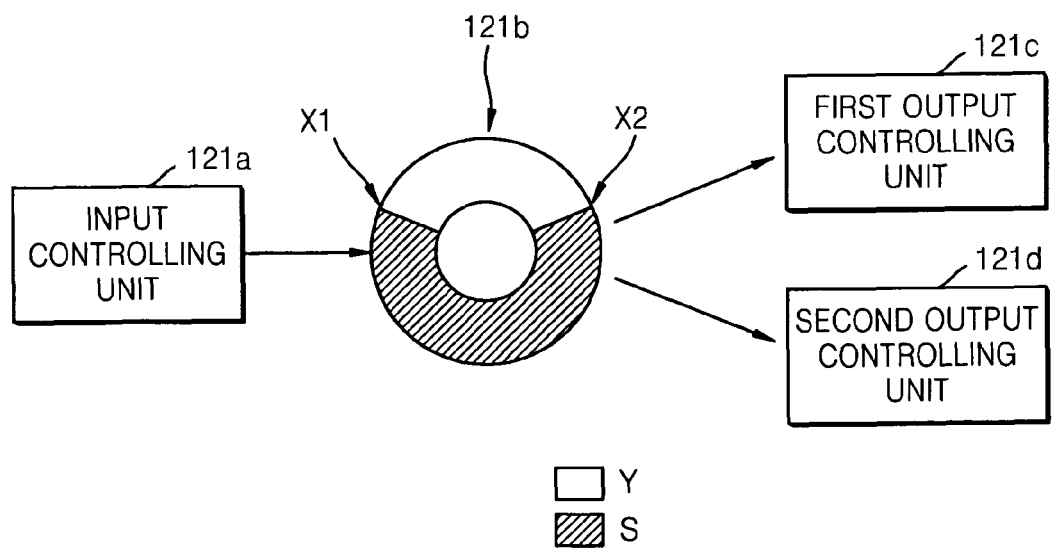
FIG. 6 is a block diagram illustrating a process in which data is temporally stored in a ring buffer having one input and a plurality of outputs in terms of data transmission, wherein the process is performed in an application layer of the Internet network apparatus of FIG. 2, according to an embodiment of the present invention.

FIG. 6 is a block diagram for illustrating a process in which data is temporally stored in a ring buffer 121b having one input and a plurality of outputs for data transmission, wherein the process is performed in the application layer 121 of the Internet network apparatus of FIG. 2.

Referring to FIG. 6, the application layer 121 of the communication unit 120 includes an input controlling unit 121a, the ring buffer 121b, and first and second output controlling units 121c and 121d.

Data that is input via the input controlling unit 121a for each respective channel is input to the ring buffer 121b. Then, a client reads the data recorded in the ring buffer 121b via the first and second output controlling units 121c and 121d. The data is provided by an encoder.

The ring buffer 121b is employed for each respective channel. The ring buffer 121b includes output pointers (Pout) corresponding to respective clients connected to the ring buffer 121b, and thus the automatic traffic control (ATC) algorithm can be employed for each respective client. That is, since the ring buffer 121b asynchronously operates in terms of outputting data input to the ring buffer 121b, and an input speed and an output speed do not affect each other, the ring buffer 121b can process image data in real time. In addition, even though a client cannot receive image data since a penalty is enforced on the client due to slow transfer rate, operations of inputting and outputting other image data are not affected.

The input controlling unit 121a temporally stores data in the ring buffer 121b clockwise. At this time, when the ring buffer 121b has no space for storing data after one rotation, previous data is removed and then current data is stored in the ring buffer 121b. Thus, data to be transferred always exists in the ring buffer 121b. When data is stored in the ring buffer 121b clockwise, data can be always output.

Figure 7:
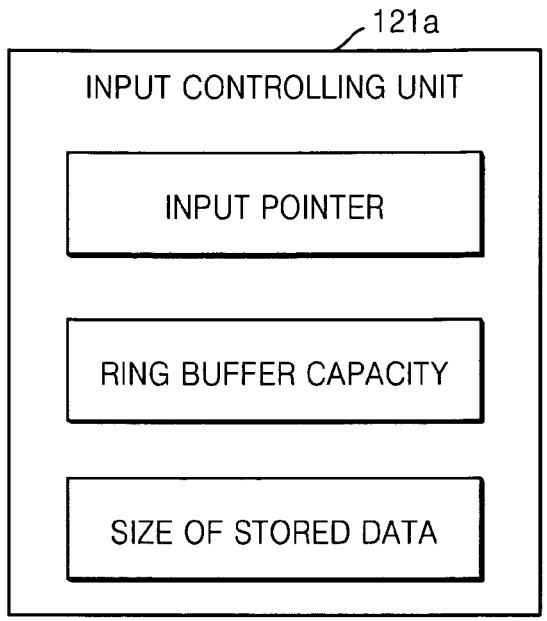
FIG. 7 is a block diagram of an input controlling unit illustrated in FIG. 6.

With reference to FIG. 7, the input controlling unit 121a will be described in more detail.

The input controlling unit 121a controls the ring buffer 121b to store data by using parameters such as a current input pointer (Pin) that represents information regarding a location of the ring buffer 121b at which data can be stored, the maximum size of data that can be stored in the ring buffer 121b, and the size of data that is previously stored.

In particular, with regard to the ring buffer 121b, by previously storing data at an input pointer (Pin) of X1 clockwise, an input pointer at which current data can be stored is X2, and the size of data that can be stored in the ring buffer 121b is Y, and the size of data that is previously stored is S at the input pointer X2. Thus, the current data can be stored at the input pointer X2 and the size (Y-S) of data can be stored clockwise.

In addition, data is output from the ring buffer 121b as follows. When a client is initially connected to the ring buffer 121b, the client receives front-most data as a pointer. A first client receives data from an output pointer Pout of X1 via the first output controlling unit 121c clockwise. At this time, it is checked whether the data that is lastly transferred is followed by the data that is currently output according to information regarding the order of the data that is lastly transferred. If the order is correct, the data can be transmitted to the first client. A second client can read data via the second output controlling unit 121d.

Figure 8:
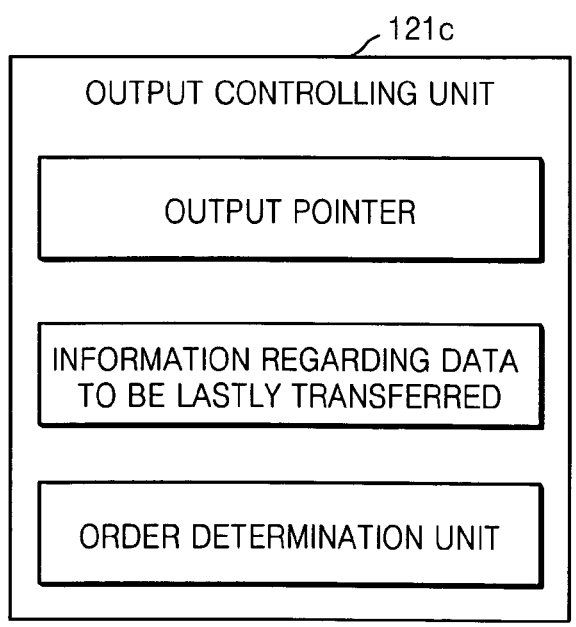
FIG. 8 is a block diagram of an output controlling unit illustrated in FIG. 6.

The above-described operation of outputting data can be performed by the first and second output controlling units 121c and 121d. In order to illustrate separate operations of outputting data for each respective client, the first and second output controlling units 121c and 121d corresponding to respective clients are separately illustrated. However, since the first and second output controlling units 121c and 121d output data according to the same principle, only the first output controlling unit 121c is illustrated in FIG. 8 in more detail. Thus, the second output controlling unit 121d has the same structure as the first output controlling unit 121c of FIG. 8.

Referring to FIG. 8, the first output controlling unit 121c comprises information regarding the order of data that is lastly transferred may be stored and an output pointer. In addition, the first output controlling unit 121c comprises an order determination unit determining whether the data that is lastly transferred is followed by data that is currently transferred.

When the data is image data, the first output controlling unit 121c may store information regarding the order of a frame of image data that is lastly transferred, and may determine whether the image data that is lastly transferred is followed by image data that is currently transferred. The first output controlling unit 121c determines the order of data since an operation of inputting data is prior to an operation of outputting with regard to the ring buffer 121b. Since previous data is removed and current data can be stored in the ring buffer 121b, it needs to be checked whether data indicated by the output pointer is followed by the data that is currently transferred. For example, since data that is desired by a client having a slow bandwidth speed may not be transferred due to an input pointer, the order of the frame that is lastly transferred needs to be remembered.

Since the output pointer may exist for each respective client, operations of outputting data to clients are not affected by each other.

Thus, as illustrated in FIG. 6, output controlling units may exist for each respective client, concurrently. For example, the first client may have the first output controlling unit 121c and the second client may have the second output controlling unit 121d.

As described above, ring buffering according to the current embodiment is a useful method when one piece of data is transmitted to a plurality of clients. In particular, when the transmission rate determination unit 130 (see FIG. 2) measures the client input data, since the transmission rate determination unit 130 receives data from the ring buffer 121b for each respective client, based on information of output pointer of the respective client, data input to the respective client can be separately measured. In addition, transmission rate is measured for each respective client, and then the transmission rate is compared with the mean transmission rate or the approximate mean transmission rate. When the transmission rate differs from the mean transmission rate or the approximate mean transmission rate, encoding of input data can be controlled to identify the transmission rate with the mean transmission rate or the approximate mean transmission rate. Alternatively, encoding of input data can be controlled to identify the transmission rate with the smallest size of the client input data.

Figure 9:
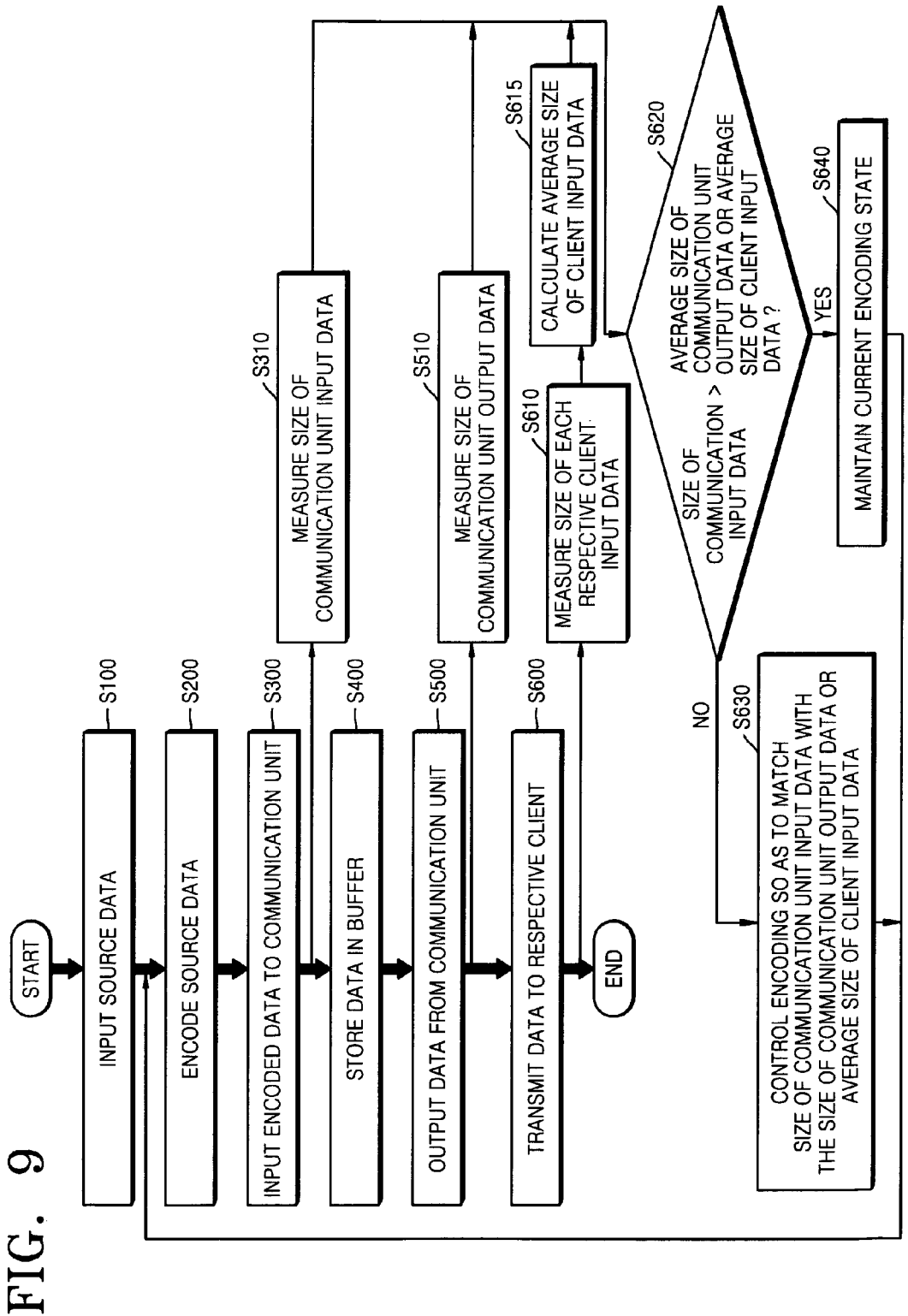
FIG. 9 is a flow chart illustrating a method of transferring data by an Internet network apparatus, according to an embodiment of the present invention.

FIG. 9 is a flow chart illustrating a method of transferring data by an Internet network apparatus, according to an embodiment of the present invention. In the current embodiment, a plurality of clients are connected to the Internet network apparatus, that is, a server.

Referring to FIG. 9, source data is input (operation S100), and then the source data is encoded (operation S200).

The encoded data is input to a communication unit of the server (operation S300), and the data is temporally stored in a ring buffer of the communication unit (operation S400).

The data is output from the communication unit (operation S500), and then the data is transmitted to the respective clients (operation S600).

At this time, regardless of operation S600, the size of communication unit input data that is input to the communication unit in operation S300 is measured (operation S310).

The size of communication unit output data that is output from the communication unit in operation S500 is measured (operation S510). In addition, the size of the client input data that is transmitted to the respective clients in operation S600 is measured (operation S610). Then, the average size or the approximate average size of client input data that is input to the clients is calculated. The approximate average value refers to the sum of the average size and a predetermined correction value. In addition, the size of the communication unit output data or the size of the client input data is the size of data that is transferred via at least a transport layer of the communication unit. Thus, the transmission rate of the communication unit output data or the client input data is measured by a TCP header that is control data encapsulated in a transport layer.

The sizes of the above-described data are compared. In particular, the size of the communication unit input data is compared with the size of the communication unit output data or the size of the client input data (in the case of a single client), or alternatively, it is determined whether the size of the communication unit input data is equal to the average size or the approximate average size (operation S620).

As a determination result, when the sizes of data are different from each other, encoding of input data is controlled to identify the size of the communication unit output data or the size of the client input data with the size of the communication unit input data (operation S630). For example, when source data is image data, the size of the communication unit output data or the size of the client input data is smaller than the size of the communication unit input data, the average size or the approximate average size, encoding is controlled so as to match the size of the communication unit input data with the size of the communication unit output data or the size of the client input data by reducing the resolution, the frame rate, or bitrate.

When the sizes are the same, a current encoding state may be maintained (operation S640).

Figure 10:
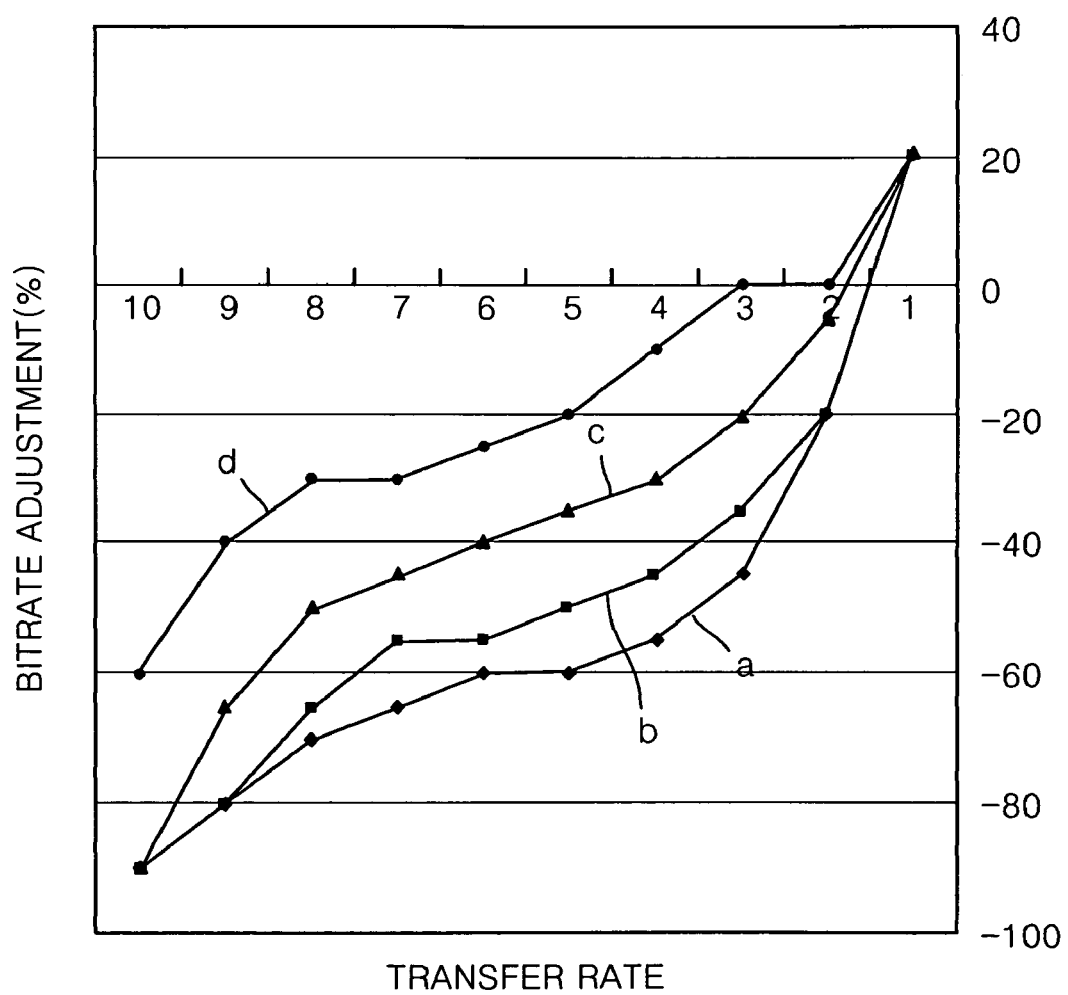
FIG. 10 is a graph for illustrating a method of controlling encoding by adjusting a bitrate, which is an example of an operation of controlling encoding illustrated in FIG. 9, according to an embodiment of the present invention.

Referring to FIG. 10, when the size of the communication unit input data differs from the size of communication unit output data, the size of the client input data, and the average size or the approximate average size, the bitrate is adjusted so as to control encoding as follows.

When the frame rate is lower, the variation of the bitrate is greater. Thus, FIG. 10 illustrates a graph showing a relationship between the bitrate and the frame rate, which is inductively achieved by using various samples. The graphs show bitrate adjustment versus transfer rate.

In order to adjust the bitrate, a plot corresponding to a frame rate is selected, and bitrate adjustment corresponding to the reduction of the transfer rate can be achieved from the selected plot. In FIG. 10, frame rates of plots "a", "b", "c" and "d" are 30 to 20, 19 to 10, 9 to 5, and 4 to 1, respectively.

For example, when frame rate is 25, the plot "a" is selected. When transfer rate is reduced from 4.5 to 3.5, it can be seen that bitrate is reduce by about 10%. The transfer rate can be expressed as transmission rate versus time.

According to the above embodiments of the present invention, by determining the size of data transferred via at least a transport layer of a communication unit, transmission rate between a server and a client can be correctly determined. In particular, by comparing the measured sizes of communication unit input data with the size of output data (i.e., the size of the communication unit output data or the size of client input data), when the size of client input data is smaller than the size of the communication unit input data, that is, when it is determined that the Internet network apparatus is overloaded for transferring data, the size of the communication unit input data is adjusted so as to match the size of the communication unit input data with the size of the output data. Thus, desired data can be smoothly transferred between a server and a client.

In addition, an application layer of a communication unit employs a single input multi output (SIMO) ring buffer by which clients can separately receive data by using their own output pointers, and thus the transmission rate transmitted to respective clients can be separately determined even though one piece of data is transmitted to a plurality of clients. By controlling encoding of data based on the transmission rate, optimum normal data can be transmitted to all clients.

The system or systems may be implemented on any general purpose computer or computers and the components may be implemented as dedicated applications or in client-server architectures, including a web-based architecture. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions executable on the processor on media such as tape, CD-ROM, etc., where this media can be read by the computer, stored in the memory, and executed by the processor.

For the purposes of promoting an understanding of the principles of the invention, reference has been made to the preferred embodiments illustrated in the drawings, and specific language have been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An Internet network apparatus comprising:
    an encoder for encoding source data, wherein the source data is image data and generating communication unit input data;
    a communication unit for sequentially transmitting communication unit input data to a client via communication layers that include an application layer, a transport layer, an Internet protocol (IP) layer and a network connection layer;
    a transmission rate determination unit for comparing the communication unit input data with communication unit output data or a client input data, the communication unit output data being transferred and compared via at least the transport layer or lower communication layer and being output from the communication unit, and the client input data being transferred to at least one client; and
    a transmission rate controlling unit for controlling the encoder in response to a comparison result of the transmission rate determination unit.
    wherein the transmission rate determination unit comprises:
        a first measurement unit for measuring a size of the communication unit input data;
        a second measurement unit for measuring a size of the communication unit output data or a size of the client input data; and
        a determination unit for comparing the size of the communication unit input data, which is measured by the first measurement unit, and the size of the communication unit output data or the size of the client input data, which is measured by the second measurement unit;
    wherein the transmission rate controlling unit is configured for controlling the encoder to adjust any one selected from the group consisting of a frame rate, a bitrate, and a resolution of the image data in response to the comparison result of the transmission rate determination unit.

2. The apparatus of claim 1, wherein when the transmission rate determination unit is configured for determining whether the size of first data measured by the first measurement is smaller than the size of second data measured by the second measurement unit,
    the transmission rate controlling unit configured for reducing the frame rate, the bitrate, or the resolution of the image data.

3. The apparatus of claim 1, wherein the transmission rate determination unit further comprises:
    a calculation unit for calculating the average size of the client input data; and
    the determination unit for comparing the communication unit input data measured by the first measurement unit with the average size of the client input data calculated by the calculation unit.

4. The apparatus of claim 3, wherein the calculation unit is configured to add a correction value to the average value to generate an approximate average size, and
    the determination unit is configured to compare the size of the communication unit input data with the approximate average size.

5. The apparatus of claim 1, wherein the communication unit comprises:
    a ring buffer for temporally storing the communication unit input data;
    an input controlling unit for controlling the storing of the communication unit input data; and
    an output controlling unit for controlling outputting of the stored data.

6. The apparatus of claim 5, wherein the input controlling unit is configured for storing data in the ring buffer according to an input pointer, a capacity of the ring buffer, and the size of data that is previously stored.

7. The apparatus of claim 5, wherein the output controlling unit is configured for controlling reading data from the ring buffer according to an output pointer, information regarding an order of frames of a last image, and the order.

8. The apparatus of claim 7, wherein the client has an output pointer.

9. A method of transferring data by using an Internet network apparatus, comprising:
    inputting source data, wherein the source data is image data;
    encoding the source data;
    inputting the encoded data to a communication unit;
    sequentially transmitting the encoded data to at least one client via communication layers that include an application layer, a transport layer, an IP layer and a network connection layer of the communication unit;
    measuring a size of the communication unit input encoded data;
    measuring a size of communication unit output data output from the communication unit or a size of client input data transmitted to the client, wherein the communication unit output data and the client input data are transferred and measured via the transport layer or lower communication layer;
    comparing the size of the communication unit input encoded data with the size of the communication unit output data or the size of the client input data; and controlling the encoding of the source data according to a comparison result;

wherein the controlling is configured to adjust any one selected from the group consisting of a frame rate, a bitrate, and a resolution of the image data in response to the comparison result of the transmission rate determination unit.

10. The method of claim 9, further comprising:

when the size of the communication unit output data or the size of the client input data is greater than the size of the communication unit input data, encoding the source data so as to reduce a frame rate, a bitrate, or a resolution of the communication unit input data.

11. The method of claim 9, further comprising:

calculating an average size of the client input data that is input to a plurality of clients; and comparing the communication unit input data with the average size of the client input data.

12. The method of claim 11, further comprising:

when the average size of the client input data is greater than the size of the communication unit input data, encoding the source data so as to reduce a frame rate, a bitrate, or a resolution of the communication unit input data.

13. The method of claim 11, further comprising:

calculating an approximate average size of the client input data by adding a correction value to the average size; and comparing the communication unit input data with the approximate average size of the client input data.

14. The method of claim 11, further comprising:

when the approximate average size of the client input data is greater than the communication unit input data, encoding the source data so as to reduce a frame rate, a bit rate, or a resolution of the communication unit input data.

15. The method of claim 11, further comprising:

copying the communication unit input data and storing communication unit input data in a ring buffer according to an input pointer, a capacity of the ring buffer, and the size of data that is previously stored; and reading data stored in the ring buffer according to an output pointer, information regarding an order of frames of a last image, and the order.

* * * * *